United States Patent [19]

Barth

[11] 3,929,988

[45] Dec. 30, 1975

[54] FLAVORED DENTIFRICE

[75] Inventor: Jordan B. Barth, East Brunswick, N.J.

[73] Assignee: Colgate-Palmolive Company, New York, N.Y.

[22] Filed: June 21, 1974

[21] Appl. No.: 481,655

[52] U.S. Cl. ............................... 424/54; 424/49
[51] Int. Cl.² .................... A61K 7/16; A61K 9/50
[58] Field of Search ............................ 424/49–58

[56] References Cited
UNITED STATES PATENTS
3,516,941  6/1970  Matson ............................ 252/316

OTHER PUBLICATIONS
Cloninger et al., *Science*, Vol. 170, Oct. 1970, pp. 81 and 82.

*Primary Examiner*—Shep K. Rose
*Attorney, Agent, or Firm*—Steven J. Baron; Murray M. Grill; Herbert S. Sylvester

[57] ABSTRACT

There is disclosed a dentifrice which includes as a minor proportion thereof an admixture of a dipeptide sweetener and an acid-containing component which admixture is encapsulated or covered with a shell or coating through which the same does not penetrate substantially during storage of the dentifrice and which is substantially unpenetratable by the components of said dentifrice but which shell or coating is broken during use of the dentifrice, causing the same to be released. There is also disclosed a method of making the dentifrice.

20 Claims, No Drawings

FLAVORED DENTIFRICE

This invention relates to a novel dentifrice preparation, more particularly to a dentifrice in which a particular sweetening agent is encapsulated so as to maintain it substantially separate from at least some of the dentifrice constituents during manufacture and storage but which affords release of the sweetener into the dentifrice during normal use thereof. The invention also relates to the encapsulation of other dentifrice constituents with the sweetening agent and to methods of producing the aforesaid dentifrice. Reference is made to copending application Ser. No. 583,380, Filed on June 3, 1975, which is a continuation of application Ser. No. 438,028, Filed on Jan. 30, 1974, now abandoned, which in turn is a continuation of application Ser. No. 235,038, Filed on Mar. 15, 1972, now abandoned, and corresponding to Belgian Patent No. 796,387, patented on Mar. 30, 1973, the entire disclosures of which are incorporated herein by reference.

The sweetening agent contemplated herein is a dipeptide sweetener which may be characterized by the following general formula:

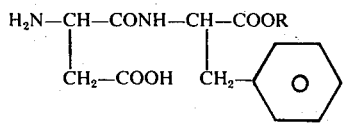

wherein R is an alkyl radical containing from about 1 to 2 carbon atoms, preferably 1, referred to commercially as Aspartame sweetener.

When R is 1, the dipeptide sweetener may be conveniently characterized as aspartylphenylalanine methyl ester.

It has been observed that taste and flavor are perhaps the most important single aspects with respect to the consumer acceptance of a dentifrice formulation. The selection of acceptable sweetener and flavoring ingredients is therefore of significant importance in the formulation of a dentifrice. It has oftentimes been stated that the foregoing is both an art as well as a science. It is an art in the sense that it requires the blending of the various components with the sweetening agents such that the final composition contains a pleasing taste as well as in providing for a composition in which the sweetener is stable. It is the foregoing that has presented particular difficulties in incorporating sweetening agents into a dentifrice inasmuch as the former must be compatible with the latter and both must remain essentially unchanged over the shelf life of the product.

At the present time, there are relatively few sweeteners which are both currently available for use in dentifrices as well as generally acceptable for use therein. This need has stimulated the search for artificial sweetening agents which may be used as sugar substitutes. The first artificial sweetener approved for general use was saccharin. Saccharin is remarkably sweeter than sucrose, having a potency of 250–350 times the latter, but it has been known to leave a bitter aftertaste. More recently, the sweetening property of cyclohexylsulfamic acid (cyclamate) and its sodium and calcium salts was discovered. Those substances are about 30 times as sweet as sucrose, but also suffer from certain disadvantages.

Other more exotic sweeteners though available are generally not acceptable for use in the dentifrice due to their stability problems vis-a-vis the various components in the dentifrice. Some of those sweeteners which do not have stability problems have the drawback that they are not suitable for use as a primary sweetener due to the unacceptable timelag prior to the onset of their sweetness and/or their associated side tastes.

A further consideration in formulating a dentifrice relates to the fact that the polishing agents employed therein are generally absorbent materials and therefore there may be a selective absorption onto the polishing agent of the sweetener with accompanying changes in physical form of the toothpaste, chemical changes and accordingly changes in overall flavor.

The sweetening agents incorporated in the dentifrice products of this invention are markedly sweeter than sucrose, possessing a potency of about 50–250 times relative to that standard. They are, moreover, lacking in the unpleasant after-taste characteristics of currently available artifical sweeteners. The sweetening agents may be manufactured by the methods disclosed in U.S. Pat. No. 3,492,131, which is incorporated herein by reference.

The aforementioned dipeptide sweetening agents wherein R is methyl, i.e., the methyl esters, and the stereoisomers of L-L configuration are particularly preferred for incorporation into the instant dental formulation. L-aspartyl-L-phenylalanine methyl ester and L-aspartyl-L-hexahydrophenylalanine methyl ester thus display a potency of about 200–250 times that of sucrose. The corresponding ethyl esters are about half as sweet.

The above sweetener has heretofore been described in the literature and even peripherily mentioned for use in consumable toiletries such as mouthwashes and toothpaste by merely including same therein. Such dental products, however, apparently never have been prepared, inasmuch as the literature is silent on the fact that the sweetener is not by itself stable in a dentifrice. The sweetness of the dipeptide sweetener has been found to rapidly dissipate soon (by shelf life standards) after incorporation into the dentifrice. It has been found that sweetness is rapidly lost in about one weeks time, the foregoing clearly unsatisfactory for the product that oftentimes has a shelf life of many months between factory packaging and ultimate consumer depletion of the product.

It has been unexpectedly found that following the teachings of the prior art leads to a product wherein the sweetness is rapidly lost and accordingly a dentifrice incorporating same no longer possesses a sufficient degree of sweetness to mask the associated side taste inherent in some dentifrices.

In order to prepare an acceptable dentifrice there is the need to control the pH of the environment of these sweeteners and accordingly, the pH within the capsule walls should be regulated by incorporation therein of an acid-containing component so as to maintain same on the acid side of the pH scale.

It is accordingly an object of this invention to provide for a novel dentifrice containing an encapsulated sweetening agent, which sweetening agent is stable in the dental preparation.

It is another object of the invention to avoid one or more drawbacks of the prior art.

Broadly speaking, the invention includes the provision of a dentifrice which contains as a minor proportion thereof an encapsulated sweetener comprising a dipeptide sweetener in admixture with an acid-containing component encapsulated or covered with a shell or coating through which the admixture does not penetrate substantially during storage of the dentifrice and which is substantially unpenetrable by the components of said dentifrice but which shell or coating is broken during use of the dentifrice, causing the same to be released.

The above-noted dipeptide esters are conveniently manufactured by methods suitable for the coupling of amino acids. An especially preferred starting material is the aspartic acid derivative wherein the amino function is protected by a benzyloxycarbonyl group and the B-carboxy function by a benzyl ester group, and the α-carboxy group is converted to a p-nitrophenyl ester function. The preparation of that substance, i.e., N-benzoyloxy carbonyl-L-aspartic acid α-p-nitrophenyl, B-benzyl diester, is described by S. Guttman *Helv. Chim. Acta*, 44 721 (1961).

The sweetening property of the dipeptide substances is dependent also upon the sterochemistry of the individual amino acids, i.e., aspartic acid and phenylalamine, from which the dipeptides are derived. Each of the amino acids can exist in either the D or L form, but it has been determined that the L-aspartyl- L - phenylalanine esters are sweet while the corresponding D - D, D - L, and L-D isomers are not. Combinations of isomers which contain the L-L dipeptide, i.e., D,L-aspartyl - L phenylalanine, L - aspartyl - D,L - phenylalanine and D,L - aspartyl D,L - phenylalanine, are also sweet.

In accordance with the invention there is incorporated into the capsule, together with the sweetener, an acid- containing component (such as an acid) so as to maintain the environment in the capsule in the acid state, such that when the mixture is added to water at 1 percent, it has a pH of about 3–5, preferably about 4.0 and thereby provides for maximum stability of the sweeter without the needed, oftentimes difficult step of making major changes in the acidity of the dentifrice vehicle. The specific chemical nature of the acid-containing component is not particularly critical since its special function is to adjust the acidity to the desired pH level, though it is understood that other non-toxic compatible materials serving a similar function may also be used. Suitable acid-containing organic and inorganic materials include citric acid, malic acid, adipic acid, fumaric acid, phosphoric acid, pyrophosphoric acid, and sulfuric acid, compatible mixtures thereof and the like.

It is to be understood that making pH changes to the dental vehicle involves a multitude of considerations, each of which is inter-related to other components therein. Problems which manifest themselves include stability of the dental vehicle as a whole, the difficulties of employing certain fluorine components at certain pH levels, corrosiveness to the dentition and the like.

The amount of acid employed will vary, depending upon the acid and the amount of sweetener, a sufficient amount is that needed to lower the pH of the sweetener to about 3–5. The acid may be blended therewith by any suitable means.

Combinations of the dipeptide sweetening agent with sugar or acid compatible synthetic sweeteners such as saccharin can likewise be incorporated into dental formulations of this invention. Lesser amounts of each sweetener are, therefore, required as a result of the effect by such combination. The sweetener-admixture with or without the additional sweeteners can also be encapsulated with suitably compatible flavoring oils where desired, in accordance with the process described hereinafter.

Toothpastes or creams whether dispensed from flexible or resilient tubes or from pressurized containers, such as "aerosol" dispensers, will normally comprise polishing agent (s), vehicle (s), surface active agent(s) or detergent(s), gelling agent(s), and various other adjuvants, such as flavors, colorants, bactercides, tooth hardeners, e.g., fluorides or fluorine compounds, and preservatives or stabilizers.

Paste or cream dentifrices may be based on aqueous or substantially non-aqueous systems. The former will usually include substantial proportions of finely divided, solid polishing agent, surface active agent, gelling agent and some non-aqueous vehicle, e.g., glycerol, sorbitol and will be opaque, whereas the latter type will often be a clear gel, containing a minor proportion of a visually clear particulate solid polishing agent, a larger proportion of non-aqueous vehicle, surface active agent and gelling agent, with a minor proportion of water often being present.

With visually clear gel dentifrices the encapsulated sweetners, which may also be colored, give the product a distinctive appearance in addition to allowing the use of a wide variety of additional sweeteners, and flavors which are more stable and "fresher" tasting when included in encapsulated form. The instant sweetener as aforesaid, is released during the use of the dentifrice by brushing action or by crushing between the teeth or between the tongue and the roof of the mouth.

Chemically compatible fluorides, antibiotics, bactericides and colorants which may or may not be as stable when distributed throughout the entire dentifrice composition may also be incorporated within the capsules and released in active form together with the sweetener when the dentifrice capsules are broken during brushing. Special color effects may be obtained by release of dyes or water dispersible pigments and color changes may be obtained where capsules of different wall thicknesses or sizes are sequentially broken. If a small proportion of colorant penetrates the capsule wall during storage, a mottled or variegated coloring effect may also be obtained in the dentifrice. Of course, by regulating capsule wall thicknesses and sizes, an even release of the same or different flavors and colors may be effected during use of the dentifrices. These advantages are obtained at little extra expense and in some cases, even by employing lesser proportions of sweetener or other materials, since they are often more stable when encapsulated.

Although the encapsulated sweetener may be employed in tooth powders, dental pastes, mouth washes, liquid dentifrices and other preparations intended for the cleaning of the mouth and teeth, because the most preferred embodiment of the invention are toothpastes or dental creams which are extrudable from pressurized or flexible containers or tubes, the invention will be described with respect to such embodiments. However, it will be clear to those of skill in the art how to apply such teachings to other forms of dental preparation than the toothpastes being described. Thus, the encapsulated sweeteners may be suspended in thickened liquid dentifrices or may be physically distributed throughout a finely divided toothpowder. Similarly, the manufacturing method herein described may be applied to the making of such other products.

The encapsulating material will usually be a substantially water-insoluble film-forming compound when the capsules are employed in an aqueous environment, preferably a synthetic organic polymeric plastic. Of such a class of compounds it is preferred to utilize the plastics and particularly thermoplastics which are of good tensile strengths so that they are capable of being made into thin walled spheres about a nucleus. Among such polymers are phenol formaldehydes, generally of a 1:1 phenol: formaldehyde ratio; vinyl chloride; polyethylenes; polypropylenes; chlorinated polyvinyl chlorides: polyvinylidene chlorides; polymethacrylates; nylons; polyurethanes; silicones; ABS resins; polyesters and polyethers. Such materials and equivalents of them are described in detail in the conventional handbooks on synthetic organic plastics. For example, see *Modern Plastics, Encyclopedia Volume*, Vol. 47, No. 10A (1970–1971), at pages 768–787. In addition to the synthetic organic polymers, other water-insoluble film forming materials may be employed, such as rubbers; shellacs; hardened or modified gelatins and organic gums; and other resins. The main consideration with respect to the mentioned resins is that they should be capable of being formed into a thin coating about the sweetening agent by use of encapsulation or microencapsulation techniques. Since the methods of encapsulation are known in the art and are not per se, specific parts of the present invention, they will not be described at length herein. However, for the sake of explanation of such methods, reference is made to an article by H. Nack entitled Microencapsulation Techniques, Applications and Problems, appearing in the *Journal of the Society of Cosmetic Chemists*, Vol. 21, at pages 85–98 (Feb. 4, 1970). In this article there are described various encapsulation processes, of which aqueous phase separation, interfacial polymerization, multi-orifice rotating cylinder, fluidized bed spray coating, melt prilling in a fluidized bed, spray drying diffusional exchange and multiple dispersion techniques are representative. Various other coating techniques known in the art may also be utilized, especially when the capsules are in the larger size portions of the ranges described in the specification. Selection of the process employed will usually depend on the operator's choice.

Also, if thick coatings are to be made, different techniques may be applied than for thinner or partial coatings. In some cases, secondary films may be produced about the primary coatings on the capsules to strengthen or otherwise affect the capsules. The mentioned article makes evident which method should be employed. In addition to the methods of the articles, other encapsulation processes that are useful are described in the patent literature, of which U.S. Reissue Pat. No. 24,899, U.S. Pat. Nos. 3,574,823; 3,711,604; 3,767,791 and German application No. 1,268,316 may be considered as representative and are incorporated by reference herein. Instead of the described water-insoluble resinous encapsulating materials there may be used for the capsule wall material, animal, vegetable, mineral and synthetic waxes, fats, gums or other coatings. Among such compounds are hydrogenated tallows; hydrogenated higher fatty acids, e.g., hydrotallow fatty acids, stearic acid; rosins; paraffinic waxes, such as are derived from petroleum hydrocarbons; carnauba wax, Montan wax, and polyoxyethylene waxes, such as those sold as Polawaxes. Higher fatty acid mono, di- and triglycerides and higher fatty acid esters of higher fatty alcohols are also useful, as are cellulosic materials, such as ethyl cellulose, butyl cellulose, nitrocellulose and compatible mixtures thereof.

When the medium in which capsules are dispersed is a non-aqueous one, such as an essentially organic medium in which the normally water-soluble compounds do not appreciably or substantially dissolve and in which some of the otherwise useful encapsulating materials dissolve, soften or deteriorate, one may wish to use more hydrophilic encapsulating materials, such as starches, water-soluble gums, sodium carboxymethyl cellulose, polyvinyl alcohol, or even inorganic or organic salts. Such materials will be processed in a manner similar to that applicable to the essentially water-insoluble and water- and oil insoluble encapsulating substances.

Although capsules of various gross sizes may be utilized, as well as those which are micro-sized, for the purpose of the present invention it will generally be most desirable for the capsule sizes not to be so great as to result in their individual detection by the tongue, teeth or mouth parts. Normally, the capsules can take any shape, it is preferred, however, that they be substantially spherical or of rounded cube shape with a diameter or equivalent diameter in the one micron to two millimeters range, preferably in the range of 50 microns to one millimeter. An especially desirable range for some applications is from about 250 to 500 microns. The thicknesses of the walls of the capsules may range from about 0.1 micron to about one millimeter but they are normally in about the one to about 100 micron range.

While spheres are the most common shapes of the capsules, other shapes as stated may also be utilized.

With the sweetening agent-acid-containing component admixture in the capsules there may also be present selective adjuvants, such as compatible enzymes to facilitate cleaning of plaque from the teeth and breaking down of proteinaceuous materials trapped between them; compatible polishing agents; such as the silicates and inert, water-insoluble aluminas referred to hereinafter; bactericides, e.g., iodinated nonionic surface active materials, iodinated fats and higher fatty acids, esters and monoglycerides, tetrabromosalicylanilides, hexachlorophene; antienzymatic compounds intended to discourage the formation of plaque on the teeth; and coloring agents, including the conventional F.D. & C. reds, yellows, blues, greens, and other colors and mixtures thereof and water-dispersible pigments, e.g., phthalocyanines. Of course, compatible mixtures of such materials may be employed. In some cases, suitably compatible emulsifiers or surface active agents of the types described subsequently may also be present with the sweetener being encapsulated. It will generally not be necessary to adjust the density of the microcapsuled sweetener and/or other materials to maintain them well dispersed in the body of the dentifrice because the viscosity or thickness of the dentifrice is normally sufficient to prevent movement of the capsules except when the dentifrice is being intentionally discharged from a container. Nevertheless, if such density adjustment is considered desirable, as when suspensions of sweetener capsules are in comparatively thin liquid media, adjuvants may be chosen to adjust such density for best suspending of the capsules in the medium. In some cases, minor proportions of air or other gas may be present in the capsules or occluded thereon to maintain the correct density for best suspending effects.

The dentifrice formulation of the invention includes liquids and solids that are proportioned as further defined hereinafter to form a creamy mass of desired consistency which is extrudable from an aerosol container or a collapsible tube (for example aluminum or lead). In general, the liquids in the dental cream will comprise chiefly water, glycerine, aqueous solutions of sorbitol, propylene glycol, polyethylene glycol 400, etc., including suitable mixtures thereof. It is advantageous usually to use a mixture of both water and a humectant or binder such as glycerine or sorbitol. The total liquid content will generally be about 20 to 75 per cent by weight of the formulation. It is preferred to use also a gelling agent in dental creams and gels such as the natural and synthetic gums and gum-like materials for example, Irish moss, gum tragacanth, methyl cellulose, polyvinylpyrrolidone, hydrophilic colloidal carboxyvinyl polymers, such as those sold under the trademark Carbopol 934 and 940 and synthetic silicated clays such as those sold under the trademark Laponite CP and Laponite SP. These grades of Laponite have the formula $$[Si_8Mg_{5.1}Li_{0.6}H_{7.6}O_{24}]^{0.6-}Na^+_{0.6}$$

The solid portion of the vehicle is usually present in an amount of up to about 10 percent preferably about 0.2 to 5 percent by weight of the formulation.

The proportions of gelating agents or thickeners in the present dentifrices are sufficient to form an extrudable, shape-retaining product which can be squeezed from a tube onto a toothbrush and will not fall between the bristles of the brush but rather, will substantially maintain its shape thereon. In almost all cases no more than about 10 percent of gelling agent need be used and in most instances about 0.5 to about 10 percent will suffice, with the preferred range, especially applicable to sodium carboxymethyl cellulose, being from 0.5 to 1.5 percent.

The liquid vehicle of the dentifrice, together with the gelling agent(s) and other constituents, forms an extrudable mass of a non-dripping consistency when extruded from a collapsible tube, such as an aluminum or lead tube. Thus, by the addition of more vehicle, the dental cream can be thinned and conversely, by the addition of more solids, especially more gelling agents, the products can be thickened. In most dentifrices, the liquid portion comprises water, glycerine and sorbitol, with the last usually being added in aqueous solution, or various suitable mixtures thereof. In the present description the vehicle will be considered as distinct from the water. Although it is preferred to employ mixtures of glycerol and sorbitol, other suitable vehicles may also be present, either with the mentioned polyhydric alcohols or in replacement for them. Thus, propylene glycol, polyethylene glycol, mannitol and polypropylene glycol may be employed providing that they are physiologically acceptable and produce products having a desired refractive index, in the case of manufacture of visually clear dentifrices. Normally, the proportion of vehicle is determined by the physical properties of the extrudate. Usually, however, about 10 to 90 percent of the vehicle will be employed, with about 10 to 35 percent being a typical range for production of opaque dentifrices and about 40 to 90 being useful for the manufacture of clear dental preparations. Preferred ranges are, respectively, about 15 to 30 percent of the polyhydric alcohols for the opaque dentifrices and about 50 to 75 percent in the clear products.

In the opaque products it is preferred that the glycerol: sorbitol ratio, if both these polyhydric alcohols are present, should be about 0.3:1 to 10:1 and in the clear products about 1:5 to 5:1, more preferably about 1:3 to 1:1.

The water content of the product, including free water present with the sorbitol solution, in any synthetic detergent mixture present and in any other constituents, often is greater for the opaque products than for the clear products. Thus, for the opaque dentifrices the water content may be about 5 to 35 percent but will usually be about 8 to 30 percent, preferably about 20 to 30 percent. With respect to the clear dentifrices, this range may be from about 0 to about 30 percent, but will normally be about 10 to 20%, most usually about 15 to 20 percent. The water employed will preferably be deionized water and usually is irradiated with ultraviolet light to assure sterility of the product. In a similar manner, if considered important, the entire product may be irradiated while being mixed, degassed or otherwise processed so as to decrease bacterial counts.

In the preparation of tooth powders, it is usually sufficient to admix mechanically, e.g., by milling, the various solid ingredients, in appropriate quantities and particle sizes, and thereafter preferably uniformly, admixing therewith the encapsulated material.

In chewable dental tablets the solids and liquids are proportioned similarly to the amounts in dental creams and the flavor is blended with the solids and liquids, a waxy matrix such as polyethylene glycol having a molecular weight of about 6,000 by weight, generally in amount of about 4–20 percent by weight, in order to facilitate forming a tablet of desired size and shape.

In addition, the formulation will generally include a dentally acceptable, substantially water-insoluble, polishing agent of the type commonly employed in dental creams. The polishing agents are usually finely divided water insoluble powdered materials of particle sizes such that they pass a 140 mesh screen, U.S. Standard Sieve Series. Preferably, they are from 0.1 to 40 microns, most preferably from 2 to 20 microns in particle sizes, with distribution of particle sizes being normal over the range. Representative polishing agents include, for example, dicalcium phosphate, tricalcium phosphate, insoluble sodium metaphosphate, aluminum hydroxide, including hydrated alumina, colloidal silica, magnesium carbonate, calcium carbonate, calcium pyrophosphate, bentonite, etc., including suitable mixtures thereof. When employed, it is preferred to use the water insoluble phosphate salts as the polishing agent and more particularly insoluble sodium metaphosphate and/or a calcium phosphate such as dicalcium phosphate dihydrate in dental creams.

The above listing of polishing agents, and other listings of other constituents of the dentifrice composition to be given in the present specification are not intended to be exhaustive and therefore, for other materials of these types reference should be made to a standard handbook, such as *Cosmetics: Science and Technology*, by Sagarin, 2nd printing, 1963, published by Interscience Publishers, Inc. Most of the polishing agents mentioned are most useful in the preparation of opaque dentifrices but some of them, such as the colloidal silicas, especially the silica xerogels, and complex sodium aluminosilicates, such as those sold under the trademark Syloid as Syloid 72 and Syloid 74 or under the trademark Santocel as Santocel 100 and synthetic alkali metal aluminosilicate complexes may be particularly useful, in the manufacture of clear dentifrices, because their indexes of refraction approximate those of the rest of the dentifrice constituents in an appropriate vehicle, i.e., of the gelling agent-liquid (generally including humectants such as glycerine and sorbitol) systems commonly used in dentifrices.

The content of polishing agent in the final dentifrice product is variable, generally being greater for the opaque than for the translucent or transparent dental gels. For example, in the manufacture of commercially acceptable opaque form-retaining, extrudable dental creams there usually will be present about 20 to 75 percent of polishing agent, e.g., dicalcium phosphate, but in the manufacture of clear dental gels, also form-retaining and extrudable, the content of polishing agent is typically about 5 to 40 percent. The preferred proportions of such constituents are about 40 to 60 percent and about 10 to 30 percent, respectively. In the case of the polishing agent for opaque products, a most preferred composition includes hydrated dicalcium phosphate and anhydrous dicalcium phosphate, with the latter being present to the extent of about 5 to 20 percent of the total dicalcium phosphate content. With respect to the transparent or translucent dental gels, either sodium alumino-silicate complex or silica xerogel will usually be employed separately, although mixtures thereof may find special advantages in some products where the desired polishing properties may be so regulated. It will be seen that the polishing agents utilized in accordance with the invention are normally water-insoluble inorganic metal oxides, hydroxides, salts and hydrates but water-insoluble organic compounds may also be employed in substitution thereof, although usually for only minor proportions of the total polishing agent. For example, polyacrylamides, polymethyl methacrylates, polyesters and nylons may be utilized.

Of the water insoluble polishing agents, most are well known chemical compounds. The complex aluminosilicate salts, which appear to contain interbonded silica and alumina having Al-O-Si bonds, are described by Tamele, in "Chemistry of the Surface and the Activity of Aluminum-Silica Cracking Catalysts", appearing in *Discussions of the Faraday Society*, No. 8, pages 270–279 (1950), particularly at page 273, FIG. 1, Curve 3, and in the article by Milliken et al, entitled "The Chemical Characteristics and Structure of Cracking Catalysts", in *Discussions of the Faraday Society*, No. 8, 279–290 (1950), particularly in the sentence bridging pages 284 and 285. The colloidal silicas used are silica xerogels. Typically they contain up to about 20 percent of water, have a refractive index of about 1.44 to 1.47 and a loose bulk density of about 0.07 to 0.12 g./c. cm. and are of particle sizes of about 1 to 20 microns. Appropriate xerogels have been marketed under the trademarks Syloid 63 and Syloid 74.

Organic surface-active agents are used in the compositions of the present invention to assist in achieving thorough and complete dispersion of the instant compositions throughout the oral cavity and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable such detergents are water-soluble salts of higher fatty acid monoglyceride monosulfates, such as the sodium salt of the monosulfated monoglyceride of hydrogenated coconut oil fatty acids, higher alkyl sulfates, such as sodium lauryl sulfate, alkyl aryl sulfonates, such as sodium dodecyl benzene sulfonate, higher alkyl sulfoacetates, higher fatty acid esters of 1,2-dihydroxy propane sulfonates, and the substantially saturated high aliphatic acyl amides of lower aliphatic amino carboxylic acid compounds, such as those having 12 to 16 carbon atoms in the fatty acid, or acyl radicals, and the like. Examples of the last mentioned amides are N-lauroyl sarcosine, and the sodium potassium and ethanolamine salts of N-lauroyl, N-myristoyl, or N-palmitoyl sarcosine which should be substantially free from soap or similar higher fatty acid material which tends to substantially reduce the effect of these compounds. The use of these sarcosinate compounds in the dentifrice compositions of the present invention is particularly advantageous since these materials exhibit a prolonged and marked effect in the inhibition of acid formation in the oral cavity due to carbohydrate breakdown in addition to exerting some reduction in the solubility of tooth enamel in acid solutions.

Other particularly suitable surface active materials include nonionic agents such as condensates of sorbitan monostearate with approximately 20 moles of ethylene oxide, condensates of ethylene oxide with propylene oxide, condensates of propylene glycol ("Pluronics") and amphoteric agents such as quaternized imidazole derivatives which are available under the trademark "Miranol" such as Miranol $C_2M$.

There may also be employed olefin sulfonate detergents, typically long chain alkenyl sulfonates.

The $\alpha$-olefin feedstock preferably contains olefins of 8–25 carbon atoms, most preferably 12–21 carbon atoms. The feedstock may contain minor amounts of other constituents, such as secondary or internal olefins, diolefins, cyclic olefins, armomatics, naphthalenes, and alkanes. Best results have been obtained when -olefins (where $R_1$ is H) constitute a major portion, for example, about 70% and preferably at least 90 percent of the feedstock. A particularly preferred olefin feedstock contains in the range of about 12 to 21 carbon atoms in the molecule and yields olefin sulfonates having excellent detergency properties. Especially good foaming characteristics have been obtained by the use of a feed stock whose alpha-olefin content consists essentially of compounds of 15 to 18 carbon atoms.

The detergent material produced in accordance with the process described above typically contains at least about 50 percent by weight of long-chain alkenyl sulfonate, up to about 33 percent by weight of hydroxy alkane sulfonate, and up to about 15 percent of impurities, such as long-chain water-insoluble sultones, most of which impurities are characterized as being soluble in acetone.

The olefin sulfonate is generally employed in the form of its sodium salt. It is within the scope of this invention to use other water-soluble salts, for example, salts of other alkali metals such as potassium salts of alkaline earth metals, such as magnesium and calcium, triethanolamine, salts and the like, as well as mixtures of a salt such as a sodium salt with the free olefin sulfonic acid.

Other suitable nonionic detergents are the condensation products of an $\alpha$-olefin oxide containing about 10 to 20 carbon atoms, a polyhydric alcohol containing about 2 to 10 carbons and about 2 to 6 hydroxyl groups and either ethylene oxide or a heteric mixture of ethylene oxide and propylene oxide. The resultant detergents are heteric polymers having a molecular weight in the range of about 400 to about 1600 and containing about 40 to 80 percent by weight of ethylene oxide, with an α-olefin oxide to polyhydric alcohol mole ratio in the range of about 1:1 to 1:3. These detergents are manufactured using well-known polymerization techniques under conditions of high temperature and high pressure. The olefin oxide and polyhydric alcohol usually are added to the reactor prior to the addition of ethylene oxide. These nonionic detergents may be mixed with similar nonionic detergents as well as other types nonionic detergents described herein.

It is preferred to use about 0.05 to 5 percent by weight of the foregoing surface-active materials in the instant oral preparations.

Various other materials may be incorporated in the dentifrice formulations of this invention. Examples thereof are coloring or whitening agents or dyestuffs, preservatives, silicones, chlorophyll compounds, ammoniated materials such as urea, diammonium phosphate and mixtures thereof, and other constituents These adjuvants are incorporated in the instant compositions in amounts which do not substantially adversely affect the properties and characteristics desired and are selected and used in proper amount depending upon the particular type of preparation involved.

The compositions of the present invention may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride, potassium stannous fluoride ($SnF_2KF$), potassium fluorozirconate, sodium hexafluorostannate, stannous chlorofluoride, and sodium monofluorophosphate. These materials which dissociate or release fluorine-containing ions, suitably may be present in an effective but non-toxic amount usually within the range of about 0.1 to 1 percent by weight, based on the water-soluble fluorine content thereof. Sodium fluoride and stannous fluoride are particularly preferred, as well as mixtures thereof.

Antibacterial agents may also be employed in the oral preparation of the instant invention to provide a total content of such agents of up to about 5 percent by weight, preferably 0.01 to 5.0 percent, most preferably about 0.05 to 1.0 percent. Typical antibacterial agents include:

$N^1$-(4-chlorobenzyl)-$N^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-$N^5$-p-chlorobenzylbiguanide;
1(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
1,6-di-p-chlorophenyl biguanidohexane;
1,6-bis(2-ethylhexyl biguanido) hexane;
5-amino-1,3-bis(2-ethylhexyl)-5-methylhexahydropyrimidine; and their non-toxic acid addition salts.

Synthetic finely divided pyrogenic silica such as those sold under the trademark Cab-O-Sil M-5, Syloid 244, Syloid 266 and Aerosil D-200 may also be employed in amounts of about 1-5 percent by weight to promote thickening or gelling and to improve clarity of the dentifrice.

The taste of the new compositions may be modified by employing suitably compatible flavoring or sweetening materials, which materials may be included within the capsule if desired or be blended into the dental vehicle along with the other materials heretofore mentioned.

The flavors which may be used either within or without the capsule include flavoring agents which may be in solid or liquid form. Most of such agents will be essential oils but the flavors may also include various flavoring aldehydes, esters, alcohols and similar materials, often the higher fatty compounds, known in the art. Examples of the essential oils include oils of spearmint, peppermint, wintergreen, sassafras, clove, sage, eucalyptus, marjoram, cinnamon, lemon lime, grapefruit and orange. Also useful are such chemicals as menthol, carvone and anethole. Of these, the most commonly employed are the oils of peppermint, spearmint, and eucalyptus and anethole, menthol and carvone. In some cases flavorful solvents, such as chloroform and mock chloroform, may be employed. Such flavorings may be used as liquids or may be solidified by being mixed with a particulate carrier material, such as starch, calcium carbonate, paraffin, vegetable wax, fat, higher fatty acid or other suitable carrier substances. In the cases of solid flavors, such as vanillin, sage citric acid or licorice, the flavor may be converted to liquid form, if so desired, by dissolving it in the solvent or emulsifying it, usually with the help of a synthetic or natural emulsifying agent. The choice as to whether to utilize particulate solid or liquid flavors or to convert such flavors to a particulate solid or liquid form, respectively, will often depend on the properties desired in the flavor and its compatibility with the sweetener and any other material to be present with it, particularly where same is encapsulated with the sweetener. Thus, where chemical interactions in the capsule and degradation of the sweetener are to be avoided it may well be desirable to utilize only solid compatible flavors but in those cases where reactions are not probable or objectionable, liquids may preferably be used. Of course, even in the cases of liquids, the thickness of the liquid may be adjusted by utilization of gelling agents or thickeners, usually to the extent of less than about 10 percent of the flavor, preferably about 1 to 10 percent thereof. Similarly, the solid particles will have a viscosity of about 0.1 to 1,000 centipoises, preferably about 0.5 to 10 centipoises and the particle sizes will be about 0.1 micron to 1 millimeter, preferably about 1 to 100 microns in diameter.

The encapsulated sweetener will usually be a minor proportion of the total dentifrice product, preferably about 0.1 to 0.5 to 10 percent thereof. Of the encapsulated particles, a major portion, preferably about 60 to 99 percent will be of the encapsulating material, although, especially when diluents or carriers for the sweetener are employed, as little as about 10 percent may be used. In the most preferred embodiment, the proportion of encapsulating material will be about 70 to 90 percent. In those instances where carriers or diluents are used, they may usually amount to about 1 to 100 times the amount of actual encapsulated sweetener employed. Of course, the percentages of adjuvants or other materials also present may be regulated for best results and usually will be about 0.2 to 5 times the weight of the sweetener in the capsules.

Because the mouth is a substantially aqueous environment the flavors utilized either within or without the capsule will normally be water-soluble, emulsifiable or dispersible. The encapsulating material, and often the dentifrice base, may be chosen accordingly so as to be also substantially impenetrable by the flavor where employed, although, in some instances, a controlled leaching of other than the sweetener, such as of coloring or other adjuvant may be intentionally produced.

A convenient procedure for the preparation of the sweetener-acid component capsules is as follows: One part of ethyl cellulose is dissolved in 5 parts of ethanol. To this there is added with mixing; one part of the dipeptide sweetener, one part citric acid and 7 parts mannitol. The mixture is then wet screened (20 mesh) and dried at about 120°F. for about 2 hours. The capsules are screened through a 20 mesh screen and the capsules on the 80 mesh screen are collected.

Wax-coated cappsules are prepared by mixing equal parts of minus 80 mesh capsules (from the above) and spermaceti wax, warming until a continuous mixture is formed and wet screening through 20 mesh screen. After cooling the capsules are screened through 20 mesh screen and the capsules on the 80 mesh screen are collected.

Many other suitable procedures are possible as are known in the art and earlier referred to.

After the production of the encapsulated sweetener-acid component admixture with or without other materials therein, it is a relatively simple matter to blend them with the rest of the dentifrice constituents at a suitable point in the manufacturing procedure. In most cases, air or other gases will be removed from the dentifrice during manufacturing and such degassing will often be assisted by application of heat. In such an operation, the viscosity of the dentifrice will be diminished so that the strains of mixing will not tend as readily to break the capsule walls. Accordingly, the capsules will normally be added near the end of the mixing operation, when the viscosity of the dentifrice is lowered, usually having had air or other gases removed from it and having had its temperature raised. Then, after mixing is completed, the temperature will be lowered to about ambient, usually after filling of dentifrice into dispensing tubes or other containers. In preferred embodiments of the invention the encapsulated sweetener will be degassed before blending with the other dentifrice constituents, such degassing normally taking place at an absolute pressure of between about 1 and 260 millimeters of mercury over a period of 30 seconds to 5 minutes. The degassing of the capsules is especially useful because it helps to remove occluded air and thereby improves the appearance and properties of the product, especially if it is of the clear gel type. The temperature to which the dentifrice is raised during mixing may be about 30° to 60°C., preferably about 40° to 50°C., and the mixing time will be about 30 seconds to 10 minutes. The viscosity of the dentifrice mixture at the time of blending the capsules with the balance of the composition will usually be less than about 70 percent of that at normal ambient conditions and will preferably be less than about 50 percent of such "Viscosity". A range of apparent viscosities during mixing may be in the area of about 100 to 100,000 centipoises but the important consideration is that it will be less than would have been the case had the viscosity of the dentifrice not intentionally be diminished to promote ready mixing of the encapsulated sweetener without destruction of the capsules during mixing operations. Of course, mixing means will be employed which will not crush the capsules and which operate at a low enough speed and with great enough clearances so as not to destroy the encapsulating shell material.

Advantages obtained by the mixing technique described are significant because they result in more available encapsulated sweetener in the final product than would otherwise be the case.

When various normally incompatible materials are encapsulated in the dentifrice the maintenance of the integrity of the capsule walls prevents undesired reactions taking place in the dentifrice matrix. Also, when different thicknesses of capsule material are used, the mixing at low viscosity prevents the thinnest of these from being broken prematurely. Another advantage of the invention is that oftentimes when the dentifrice is squeezed from the tube, a fresh sweetness is released as the capsules on the surface are broken by shearing contacts with the tube neck interior walls, giving off a fresh and pleasant aroma at the moment of use, especially so where flavors are incorporated therein.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples and the appended claims, temperatures are given in degrees centigrade (°C.) and quantities of materials are expressed in parts, proportions or percentages by weight except where otherwise noted.

EXAMPLE I

The desired quantity of sweetener is admixed with a sufficient quantity of acid as shown below to result in a composition having an overall pH of about 4.

20% Aspartame Sweetener
2% Fumaric Acid
Percentages based upon the total weight of the capsule.

The above procedure is repeated, except that the desired pH is adjusted to 3, as follows:

20% Aspartame Sweetener
20% Fumaric Acid
Percentages based upon the total weight of the capsule.

EXAMPLE II

The above-prepared sweetener and acid composition is then encapsulated in substantially impenetrable shells or coatings of a variety of encapsulating materials, including (1) polyvinyl chloride; (2) polyethylene; (3) phenol-formaldehyde; (4) paraffin; (5) caroben gum; (6) shellac; (7) ethyl cellulose; (8) butyl cellulose; (9) mixture of ethyl cellulose 10 percent; carnuba wax 10 percent and mannitol 40 percent; (10) nitrocellulose and (11) hardened gelatin. The microcapsules are of size distributed over the range of about 50 microns to one millimeter, distribution being substantially normal. In other cases the distribution is controlled so that the particle sizes are in about the 250 to 500 micron range. Capsule wall thicknesses are assorted through about the 1 to 100 micron range, averaging about 50 microns.

After preparation of the microcapsules, they are degassed by subjection to a vacuum (40 mm. Hg absolute pressure) for five minutes and are then blended with a dental cream of the following formula, made as described.

DENTAL CREAM

| | % |
|---|---|
| Glycerin | 9.474 |
| Sorbitol | 17.000 |
| Carboxymethylcellulose | 1.100 |
| Na Benzoate | 0.500 |
| 10% Aspartylphenylalanine Methyl ester encapsulated sweetener | 5.0 |
| Water | 13.941 |
| Na$_2$PO$_3$F | 0.760 |
| TiO$_2$ | 0.400 |
| Insoluble Na Meta Phosphate | 41.850 |
| Anhydrous dicalcium phosphate | 5.000 |
| Alumina - Hydrated | 1.000 |
| Sodium N-lauroyl sarcosinate Sol. | 2.000 |
| Na Lauryl sulfate | 0.975 |
| Flavor (external to the capsule) | 1.00 |
| | 100.00 |

The solution of vehicle is made, subjected to the vacuum described for the encapsulated sweetener and the mixture of sweetener (preservative and gelling agent where desired) in water is prepared and subjected to degassing by the same technique. Subsequently, a pyrophosphate solution is made in 1.2 parts of tap water and is blended with the previous aqueous suspension and the mixture of vehicles. The temperature is elevated to 45°C., while the mixture is being degassed at about 40mm. Hg. absolute pressure over 10 minutes. Then, the polishing agent and detergent solution are added, after preliminary degassing. The temperature is maintained at about 45°C. and 2.5 parts of the encapsulated sweetener (and other ingredients where included) are mixed in, taking care not to have the viscosity over about 40,000 centipoises and making sure that the mixer (Dopp) clearances are such that the microcapsules are not broken. After about ten minutes mixing, with application and maintenance of elevated temperature and dentifrice preparation is considered to be complete and it is packed into tubes in conventional manner. The tubes are then, as is customary in the trade, sent to storage and cooled to ambient temperature, at which the viscosity of the product increased to about 100,000 centipoises.

EXAMPLE III

The procedure of Example 2 is repeated with the same wall materials except that the following variations are made.

The methyl ester sweetener is present at 0.3 percent, and in addition, there is also present 0.3 percent flavor of spearmint and present with the spearmint is about 0.1 percent of sodium saccharin and 2 percent of green colorant (F.D. & C. green) of the water-soluble type. All such percentages are based on the methyl ester. In some instances wherein penetrability of the flavor and colore are to be minimized, the various "internal" ingredients of the microcapsules are mixed with paraffin wax (25% of the ingredients) before encapsulation.

| | Parts |
|---|---|
| Glycerine | 7.0 |
| Sorbitol (70% aqueous solution) | 12.0 |
| Sodium saccharin in the capsule | 0.1 |
| 10% Aspartylphenylalanine methyl ester in encapsulated form | 1.5 |

-continued

| | Parts |
|---|---|
| Gelling agent (sodium carboxymethyl cellulose) | 1.0 |
| Water (irradiated tap) | 19.2 |
| Tetrasodium pyrophosphate | 0.5 |
| Water | 1.2 |
| Dicalcium phosphate | 38.0 |
| Calcium carbonate (precipitated, dense) | 10.0 |
| Sodium N-lauroyl sarcosine solution (25% aqueous) | 9.5 |
| Spearmint flavor in the capsule (essential oil of spearmint) | 1.0 |
| Green colorant in the capsule | 0.01 |

The product carried out in example 2 is repeated, after storage of the cream upon subsequent use, when the product is squeezed from the tube and placed on a toothbrush, there is a distinct fresh spearmint fragrance apparently resulting from fracturing of some of the microcapsules. Also, on use, the spearmint flavor is released from the microcapsules, as is the coloring, by contact with the toothbrush, teeth and mouth, to reinforce both the sweetener, flavoring and coloring of the product. Some of the coloring, a small proportion thereof, leaches through the capsule walls on storage and lightly colors the product but the subsequent coloring from the ruptured microcapsules and the increase in flavor resulting when the user fractures the capsule walls by brushing the teeth with the dentifrice are significantly noticeable, and indicate to the user by taste and appearance when brushing has been vigorous and may be terminated.

In variations of the formula, in which the various encapsulating materials mentioned herein are employed with the basic formula, the same results are noted. The capsules are small enough so that they are not of objectionable size or feel during use of the dentifrice.

In other embodiments, the capsules made are suspended in clear gel dentifrices, wherein the coloring materials are apparent, giving the clear gels a distinctive colored appearance. Instead of utilizing clear gels with a suitable polishing agent suspended in them, the capsules are also suspended in thickened liquid detergents, based on sodium lauryl sulfate and sodium carboxymethyl cellulose, wherein they may serve to release sweeter, coloring and flavoring (where the latter two are included) until the cleaning operation is complete.

EXAMPLES 4 - 5

The procedure of examples 1 and 2 are repeated, however, the formulations are varied as follows.

EXAMPLE 4 - DENTAL CREAM

| | Parts |
|---|---|
| Antimicrobial agent | 0.1 |
| Sodium benzoate | 0.15 |
| 20% Aspartylphenylalanine methyl ester in encapsulated form | 2.0 |
| Sodium lauryl sulfate | 1.5 |
| Insoluble sodium metaphosphate | 40.6 |
| Dicalcium phosphate dihydrate | 5.0 |
| Titanium dioxide | 0.4 |
| Stannous fluoride | 0.4 |
| Gum tragacanth | 1.4 |
| Oil of wintergreen (in the capsule) | 1.0 |
| Color | 0.03 |
| Water | 22.12 |
| Glycerin (99.3%) | 27.10 |

This composition is used by brushing the teeth therewith at least once daily.

In the above dental cream, the sodium lauryl sulfate may be replaced by sodium-N-lauroylsarcosinate, the capsules. Proportions of the capsules employed are 1, 2 and 5 percent, with the flavor accounting for about 30 percent of the total capsule weight.

EXAMPLE 5 - DENTAL CREAM

|  | Parts |
|---|---|
| Antimicrobial agent | 0.1 |
| 30% Aspartylphenylalanine methyl ester in encapsulated form | 1.0 |
| Sodium benzoate | 0.5 |
| Tetrasodium pyrophosphate | 0.25 |
| Dicalcium phosphate dihydrate | 36.75 |
| Calcium carbonate | 5.0 |
| Sodium carboxymethylcellulose | 0.75 |
| Olefin sulfonate | 2.0 |
| Glycerine (99.3%) | 23.95 |
| Oils of peppermint and spearmint, 1:1 (in the capsule) | 0.8 |
| Water | 19.7 |

In other experiments, the flavor(s) in the capsules are changed to eucalyptus, anethole, menthol and carvone and the proportions are varied over about the 0.5 to 5 percent range, with similar results. Generally, however, the total amount of flavoring employed in the capsule will be from 0.1 to 1.0 based upon the total weight of the dentifrice, and external thereto from about 0.5 to 2 percent based upon the total dentifrice, for best taste effects.

EXAMPLE 6

|  | Parts |
|---|---|
| Glycerine (99.5% C.P.) | 17.0 |
| Hydroxyethyl cellulose | 1.0 |
| 40% Aspartylphenylalanine methyl ester in encapsulated form | 0.5 |
| Deionized water, irradiated | 14.5 |
| Hydrated alumina, (2 to 20 microns in dia.) | 45.0 |
| Sodium N-lauroyl sarcosine | 2.0 |
| Glycerine (99.5% C.P.) | 2.9 |
| Deionized water, irradiated | 14.6 |
| Dental cream flavoring (essential oils, sweeteners, esters) | 0.4 |

The above opaque dental cream is made by a method corresponding to that of Example 2, wherein the various portions of the formulation are degassed under vacuum and are subsequently heated to a temperature of about 50°C., before blending in with the base of encapsulated flavors and sweetener. The hydroxyethyl cellulose is dissolved or dispersed in the glycerine and vacuum is applied, according to the method of Example 2. Degassed hydrated alumina is blended with a mixture of the glycerine, hydroxyethyl cellulose and water. Then the temperature is raised and a previoius mixture of water, glycerine and sodium N-lauroyl sarcosine (in proportions of about .46:29:2.0), degassed by the described method, is mixed in. Usual dental cream manufacturing equipment is employed.

After the preparation of the base, at an elevated temperature, the sweetener and flavor or dye where desired are encapsulated in hardened gelatin and/or phenol-formaldehyde resin and having particle sizes in the 500 to 800 micron diameter range, with wall thicknesses of about 50 to 150 microns is blended in with the dentifrice, with care being taken to avoid fracturing of the capsules. Proportions of the capsules employed are 1, 2 and 5 percent, with the flavor accounting for about 30 percent of the total capsule weight.

EXAMPLE 7

The procedure of Example 2 is followed, utilizing the formula given below, to make a clear gel dentifrice.

| Components: | Parts |
|---|---|
| Sorbitol (70%) | 75.0 |
| Glycerine | 25.0 |
| Laponite SP | 2.0 |
| Sodium N-lauroyl sarcosinate | 2.0 |
| 10% Aspartylphenylalanine methyl ester in encapsulated form | 1.0 |
| Aerosil D200 | 3.0 |
| Sodium aluminum silicate | 16.0 |
| Flavor (external to the capsule) | 1.0 |
| Color | 1.0 |
| Water | 20.0 |

The sodium aluminumsilicate employed is a complex having a refractive index of about 1.46, a moisture content of about 6 percent, an average particulate size of about 35 microns and a sieve loose bulk density of about 0.07 g./cc.

The various parts of the formulation are blended together and subjected to vacuum treatment and heat, in the manner described with respect to the preceding examples, after which the encapsulated sweetener is added. The encapsulating agents are those described in Example 2.

The product resulting is of excellent clarity and taste and the microcapsules of sweetener, when they have coloring materials such as D.C. Red No. 33 added to them, to the extent of 1–10 percent, of the sweetener, give a product a distinctive appearance. The specific gravity of the product is about 1.37 and its pH is about 8.8

EXAMPLE 8

The procedure of example 2 is followed for the production of a transparent cream.

|  | Parts |
|---|---|
| Glycerine | 25.00 |
| Sodium carboxymethylcellulose | 0.70 |
| 10% Aspartylphenylalanine methyl ester in encapsulated form | 2.0 |
| Sodium benzoate | 0.50 |
| Sorbitol (70%) | 43.83 |
| Water | 3.00 |
| Sodium aluminum silicate | 16.00 |
| Syloid 244 | 5.00 |
| Flavor (external to the capsule) | 1.00 |
| Sodium lauryl sulfate | 2.00 |

In the preceding examples, the percent sweetener as referred to is that percentage of the capsule being comprised of sweetener. The parts of encapsulated sweetener, refers to the parts of the total capsule per 100 parts of dentifrice composition.

The invention has been described with respect to various examples thereof but it is clear that such examples and previously given illustration are not limitative, since one of ordinary skill in the art be able to employ substitutes and equivalents without departing from the inventive concept.

What is claimed is:

1. A dentifrice having a liquid vehicle and which includes as a minor proportion thereof an encapsulated sweetener composition comprising about 0.1 to 10% of a dipeptide sweetener in admixture with a non-toxic acid-containing component and encapsulated or covered with a shell or coating through which said admixture does not penetrate substantially during storage of the dentifrice and which is substantially unpenetrable by the components of said dentifrice but which shell or coating is broken during use of the dentifrice, causing the same to be released, said acid-containing component included in amounts sufficient to maintain the pH in said capsule at substantially about 3–5 and thereby impart an acid pH to said sweetener upon fracture of said capsule.

2. A dentifrice according to claim 1 wherein said dipeptide sweetener has the general formula:

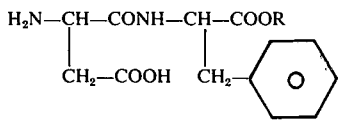

wherein R is $C_{1-2}$.

3. A dentifrice according to claim 2 wherein R is a methyl group.

4. A dentifrice according to claim 1 wherein said acid-containing component is selected from the group consisting of citric-, malic-, adipic-, fumaric-, phosphoric-, sulfuric-, pyrophosphoric acids and compatible mixtures thereof.

5. A dentifrice according to claim 1 which is a toothpaste including a polishing agent in said vehicle.

6. A dentifrice according to claim 5 which comprises about 20 to 90 percent of said vehicle and about 5 to 75 percent of said polishing agent, said capsules being of particle sizes within the range of about 1 micron to 2 millimeters in diameter.

7. A dentifrice according to claim 6 which also includes about 0.5 to 10 percent of a gelling agent and about 0.5 to 5 percent of a synthetic organic or soap detergent and in which the polishing agent is selected from the group consisting of sodium aluminum silicate, hydrated alumina, dicalcium phosphate, silica xerogel and calcium carbonate and mixture thereof, the vehicle is selected from the group consisting of sorbitol, glycerol and water and mixtures thereof, the gelling agent is selected from the group consisting of sodium carboxymethyl cellulose, hydroxyethyl cellulose, polyvinyl alcohol, Irish moss and silica aerogel and mixtures thereof, the synthetic organic or soap detergent is selected from the group consisting of water-soluble higher fatty acid soaps and synthetic anionic and non-ionic detergents, and the capsule wall material is selected from the group consisting of animal, vegetable, mineral and synthetic waxes, thermoplastics and resinous materials.

8. A dentifrice according to claim 7 which contains therein, apart from the encapsulated sweetener, about 0.1 to 2 percent of flavoring material, with a greater proportion of such or different flavoring material present in encapsulated form.

9. A dentifrice according to claim 5 additionally containing 0.1 to 3.0 percent of a further sweetening agent in said vehicle.

10. A dentifrice according to claim 5 additionally containing 0.1 to 10 percent of a combination of flavoring oils and sweetening agents in said vehicle.

11. A dentifrice according to claim 1 wherein a minor amount of a member selected from the group consisting of further sweetening agents, flavor oils and an inert dental polishing agent is encapsulated with said dipeptide sweetener.

12. A dentifrice as defined in claim 5 wherein said vehicle is aqueous.

13. A dentifrice as defined in claim 5 wherein said vehicle includes a water-insoluble dental polishing agent.

14. A dentifrice as defined in claim 1 further containing an effective amount of an anti-bacterial agent.

15. A dentifrice as defined in claim 5 wherein said polishing agent is about 20–95 percent by weight of the vehicle.

16. A dentifrice as defined in claim 1 additionally containing a surface-active agent.

17. A dentifrice as defined in claim 16 wherein said surface-active agent is selected from the group consisting of water-soluble sulfates of compounds having long chain alkyl radicals.

18. A dentifrice as defined in claim 16 wherein said surface-active agent is an α-olefin sulfonate.

19. A dentifrice according to claim 15 in clear gel form, containing a polishing agent of approximately the same index of refraction as the balance of the dentifrice apart from the encapsulated portion, the capsules of which are of particle sizes in the 50 microns to 1 millimeter diameter range.

20. A dentifrice according to claim 19 wherein a coloring agent present in the capsules is capable of partially penetrating the walls of the capsules and entering the body of the rest of the dentifrice to color it to an extent less than that of the color of the coloring agent in the interior of the capsules when the dentifrice is ready for use.

* * * * *